United States Patent [19]

Hamburger

[11] 4,302,192
[45] Nov. 24, 1981

[54] COMBINED PATTERN HOLDER AND PATTERN POSITION INDICATOR

[76] Inventor: Manny C. Hamburger, 2233 Oregon Ct., St. Louis Park, Minn. 55426

[21] Appl. No.: 88,795

[22] Filed: Oct. 29, 1979

[51] Int. Cl.³ .............................................. G09B 19/20
[52] U.S. Cl. ..................................... 434/95; 116/240
[58] Field of Search ........................... 35/15, 27, 31 E; 116/235, 240, 236, 325; 235/61 B, 70 B; 282/29 A, 29 B

[56] References Cited

U.S. PATENT DOCUMENTS

| | | | |
|---|---|---|---|
| 139,936 | 6/1873 | Ward | 116/235 |
| 982,876 | 1/1911 | Richardson | 235/70 R X |
| 1,669,809 | 5/1928 | Card | 282/29 A |
| 1,713,025 | 5/1929 | Castleman | 235/61 B X |
| 2,301,410 | 11/1942 | Kaplan | 35/15 |
| 2,311,052 | 2/1943 | Hurup | 282/29 A |
| 2,449,810 | 9/1948 | Guenther | 35/26 X |
| 2,456,676 | 12/1948 | Chowns | 35/31 E X |
| 2,593,628 | 4/1952 | Strong | 235/70 B |
| 2,699,894 | 1/1955 | Hirsch | 235/61 B |
| 3,021,615 | 2/1962 | Ostroff | 35/24 R |
| 3,139,687 | 7/1964 | Hamer | 116/325 X |

*Primary Examiner*—Harland S. Skogquist
*Attorney, Agent, or Firm*—Wicks & Nemer

[57] ABSTRACT

A device is shown in the preferred embodiment of the present invention for holding a knitting pattern and for indicating the pattern position. The pattern is held to a pattern support face of a pattern support member by a clip member. The pattern position is recorded and visually summarized at a single location by a single notation member. Specifically, the notation member includes an elongated bar member movably mounted on the pattern support member for visually underscoring the row of the pattern. Further, and simultaneously, the notation member includes members for indicating other pattern information, shown in a first preferred form as indicators slidably mounted in grooves formed in the elongated bar member and in a second preferred form as pegs receivable in apertures formed in the elongated bar member which indicate the pattern position by indicating numerals forming a pattern position guide.

4 Claims, 6 Drawing Figures

U.S. Patent  Nov. 24, 1981  4,302,192
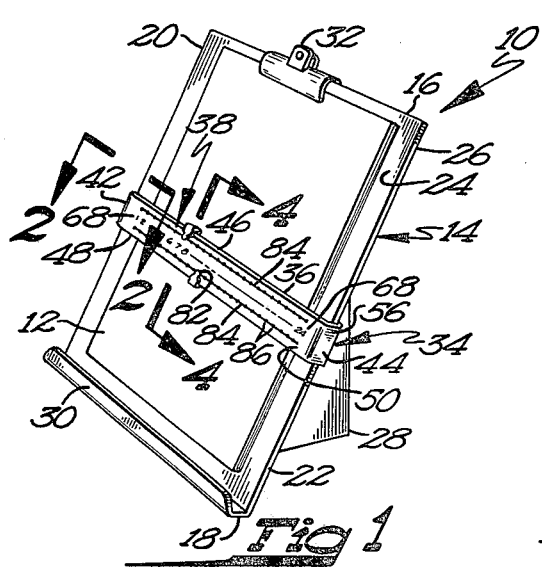
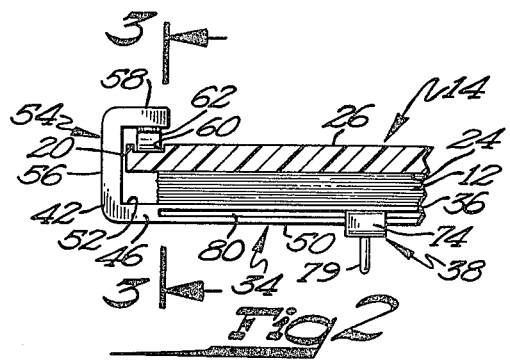
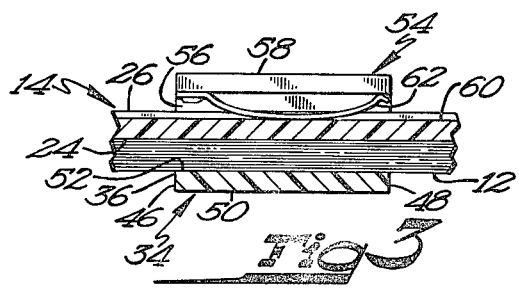
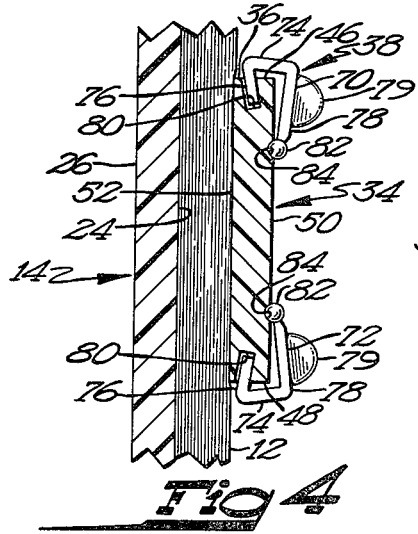
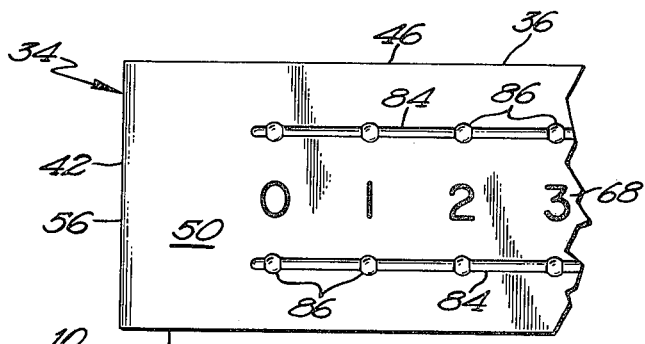
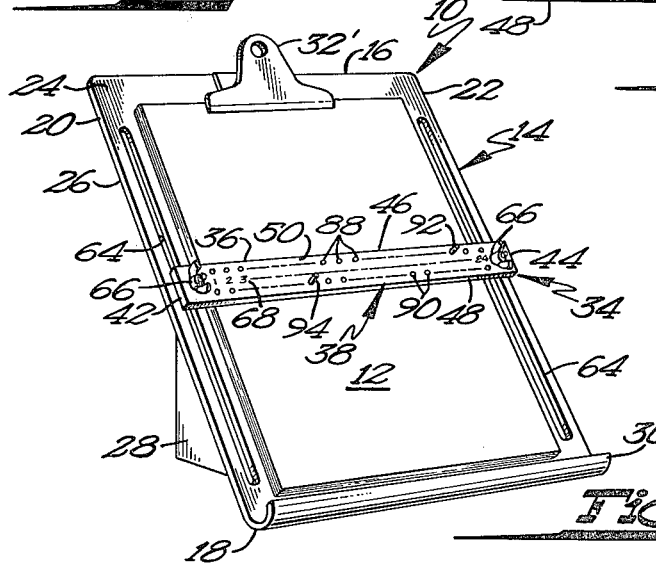

COMBINED PATTERN HOLDER AND PATTERN POSITION INDICATOR

BACKGROUND

The present invention relates generally to a pattern holder, and more particularly, to a combined pattern holder and pattern position indicator.

With the increasing amounts of tension created by modern society and with the increasing amounts of leisure time available to persons in modern society, an increasing need has been felt for hobbies or other activities which act as therapy in releasing such tension and which occupy such free time. One such activity which is within this select class is knitting, which not only meets this need but is also very productive and self-gratifying.

Knitting patterns are often very complex and therefore it is often easy to get lost in the pattern by unknowingly skipping to wrong rows or other pattern positions. This skipping causes double work as the incorrect knitting as well as any other knitting that follows the incorrect portion must be unravelled and corrected. This is very frustrating to the knitter and may occur frequently. Thus, many people, especially persons just beginning to knit, become very frustrated in trying to knit, and specifically in trying to follow patterns, and often discontinue knitting altogether because thereof.

Thus, a need has arisen for a device which allows a knitter to quickly and easily determine and maintain his/her pattern position.

SUMMARY

The apparatus of the present invention solves these and other problems by providing, in the preferred embodiment, a device for simultaneously holding a pattern and indicating the pattern position. Specifically, the device includes a pattern support member having a pattern support face allowing the support of the pattern thereon. A member is provided for holding the pattern on the support face of the pattern support member. A notation member for delineating the pattern position is provided including a member for visually highlighting the row of the pattern being knitted and simultaneously also including members located on the visually highlighting member for indicating other pattern information.

It is thus a primary object of the present invention to provide a novel device for simultaneously holding a pattern and indicating pattern information.

It is a further object of the present invention to provide such a novel device for holding a pattern and indicating pattern position which records and visually summarizes the pattern position at a single location by a single notation member.

It is a further object of the present invention to provide such a novel device for holding a pattern and indicating pattern position which allows a user to quickly and easily determine the pattern position.

It is a further object of the present invention to provide such a novel device for holding a pattern and indicating pattern position which is small in size, easy to carry, and light in weight.

These and further objects and advantages of the present invention will become clearer in the light of the following detailed description of illustrative embodiments of this invention described in connection with the drawings.

DESCRIPTION OF THE DRAWINGS

The illustrative embodiments may best be described by reference to the accompanying drawings where:

FIG. 1 shows a perspective view of a device for holding a pattern and indicating pattern position according to the teachings of the present invention.

FIG. 2 shows a sectional view of the device of FIG. 1 according to section line 2—2 of FIG. 1.

FIG. 3 shows a sectional view of the device of FIG. 1 according to section line 3—3 of FIG. 2.

FIG. 4 shows a sectional view of the device of FIG. 1 according to section line 4—4 of FIG. 1.

FIG. 5 shows a partial front view of the device of FIG. 1.

FIG. 6 shows a perspective view of an alternate embodiment of the device of FIG. 1.

All figures are drawn for ease of explanation of the basic teachings of the present invention only; the extensions of the figures with respect to number, position, relationships, and dimensions of the parts to form preferred embodiments will be explained or will be obvious once the explanation is read and understood.

Where used in the various figures of the drawings, the same numerals designate the same or similar parts in the various figures. Furthermore, when the terms "first", "second", "top", "bottom", "side", "front", "vertical", and similar terms are used herein, it should be understood that these terms have reference only to the structure shown in the drawings, as it would appear to a person viewing the drawings, and are utilized only to facilitate describing the invention.

DESCRIPTION

In the figures, a device for holding a knitting pattern 12 and indicating pattern position is generally shown and designated 10. Device 10 includes a pattern support member 14 having a top edge 16, a bottom edge 18, a first side edge 20, a second side edge 22, a first front or pattern support face 24, and a second back face 26. Front face 24 has a large area allowing the support of pattern 12 thereon, and in the preferred embodiment, has an area which exceeds the area of pattern 12. Support member 14 is formed of suitable supporting material such as rigid plastic. An easel member 28 can further be provided for holding support member 14 in a vertical or reading position. Easel member 28 can be a triangle member pivotally attached to back face 26 of member 14, as shown in the preferred embodiment, or can be any other like structure known in the art. Support member 14 may further include a knitting accessory holding device 30 shown in the preferred embodiment as a trough attached to bottom edge 18 of support member 14 for holding knitting accessories such as knitting needles, knitting hooks, crochet hooks, cable stitch needles, and the like.

Device 10 further includes a member 32 for holding pattern 12 on face 24 of pattern support member 14, shown in the preferred embodiment as a clip. Clip 32 of FIG. 1 is shown in the preferred embodiment extending over top edge 16 of member 14 and securing pattern 12 to member 14. Clip 32' of the alternate embodiment of FIG. 5 is shown as being attached to front face 24 adjacent top edge 16 of pattern support member 14 by rivets to thus clamp pattern 12 to face 24 of member 14.

Other suitable pattern holding members can be substituted for clips 32 or 32' of the preferred embodiments of the present invention which secure or otherwise hold pattern 12 to support face 24 of support member 14. It should be noted that the pattern holding members must prevent movement of pattern 12 in any direction on face 24 of member 14 especially, in the preferred embodiment, when support member 14 is placed in a vertical position by easel member 28 thus making pattern 12 susceptible to sliding down face 24 of member 14 under the force of gravity.

Device 10 also includes notation member 34 for delineating the pattern position which visually summarizes and records the pattern position at a single visual location. Notation member 34, in the preferred embodiment, includes an underscoring member 36 movable upon face 24 for visually highlighting, indicating, or designating the row of the pattern being knitted and further includes a member 38 synergistically located on and cooperating with member 36 for indicating other pattern information, such as positions.

Member 34 is shown in the preferred embodiment as an elongated bar member having a first end 42, a second end 44, a top edge 46, a bottom edge 48, a first front face 50, and a second back face 52. First and second L-shape members 54 attached to ends 42 and 44 of member 34 are provided in a first preferred form shown in FIGS. 1-5 to movably mount member 34 upon face 24 of member 14. Specifically, members 54 include a first leg 56 attached to ends 42 and 44 of member 34 which extend adjacent and parallel to edges 20 and 22 of member 14. Members 54 further include a second leg 58 attached to leg 56 which extend adjacent and parallel to but spaced from face 26 of member 14. Grooves 60 are formed in face 26 of member 14 adjacent and parallel to but spaced from edges 20 and 22 of member 14. Springs 62 attached to legs 58 of members 54 for slidable movement within groove 60 are further provided for spring loading member 34 to member 14 and for allowing vertical sliding movement. Thus, member 34 is movable on member 14 upon face 24 in a direction generally parallel to edges 20 and 22 and betwen edges 16 and 18 of member 14. Further, member 34 is frictionally held upon face 24 of member 14 at any desired location between edges 16 and 18 to prevent accidental movement of member 34 by the pressure placed on member 34 against member 14 by springs 62.

After the teachings of the present invention have become known, alternate constructions and methods of moving member 34 upon face 24 of member 14 may be obvious to persons skilled in the art. For example, one such alternate embodiment is shown in FIG. 6. Specifically, slots 64 are formed in member 14 through faces 24 and 26 adjacent and parallel to but spaced inwardly from edges 20 and 22 and extending between but spaced inwardly from edges 16 and 18. Bolts 66 are further provided extending through member 34 and slots 64. Thus, member 34 is movably on face 24 of member 14 by bolts 66 slidable and movable in slots 64 and can be removably fixed at any desired location between edges 16 and 18 by tightening and loosening bolts 66 to prevent accidental moving or to move member 34.

Member 38 is shown in the preferred embodiment as including a pattern position guide 68 consisting of a series of pattern positions shown in the preferred embodiment as numerals located on member 34 and as including indicators 70 and 72 slidable on member 34 for indicating one of the pattern positions or numerals of guide 68 or other knitting pattern information.

Indicators 70 and 72 are shown as U-shaped members including a central portion 74, a first leg 76, and a second leg 78. Leg 78 may further include a handle 79 for assisting moving indicators 70 and 72. Grooves 80 are formed in edges 46 and 48 of member 34 for receipt of legs 76 of indicators 70 and 72 for slidable movement therein. Although leg 78 extends from portion 74 at generally a right angle, leg 76 extends from portion 74 at a lesser angle such that legs 76 and 78 are not parallel but rather come together such that the free ends of legs 76 and 78 are more closely spaced than the connected ends. Grooves 80 also extend into edges 46 and 48 at an angle corresponding to the angle between leg 76 and central portion 74 of indicators 70 and 72. This angular relationship between leg 76 and central portion 74 of indicators 70 and 72 and also between grooves 80 in edges 46 and 48 resiliently tensions and retain indicators 70 and 72 on member 34 to thus prevent indicators 70 and 72 from accidentally separating or falling from or moving on member 34. To further insure the retention of and prevent accidental movement of indicators 70 and 72 on member 34, a detent or ball 82 is provided on the free end of leg 78 of each of the indicators 70 and 72 for slidable movement in grooves 84 formed on face 50 of member 34. Additionally, indents 86 can be provided in grooves 84 associated with each pattern position or numeral of guide 68 to further prevent accidental movement of indicators 70 and 72 in grooves 84. thus, the pattern position can be indicated by placing balls 82 of indicators 70 and 72 in the indent 86 corresponding to the pattern position of guide 68.

After the teachings of the present invention have become known, alternate constructions and methods for indicating the position of the pattern or other information of the pattern being knitted may also be obvious to persons skilled in the art. For example, one such alternate embodiment is shown in FIG. 6. Specifically, a series of apertures 88 and 90 are formed in face 50 of member 34 parallel to and spaced inwardly of edges 46 and 48 of member 34, respectively, with the each of apertures 88 and 90 being associated with a pattern position or numeral of guide 68. Further provided are pegs 92 and 94 for insertion into apertures 88 and 90, respectively. Thus, the pattern position can be indicated by placing pegs 92 and 94 in apertures 88 and 90, respectively, corresponding to the numerical pattern position of guide 68.

Now that the structure of the preferred embodiments constructed according to the teachings of the present invention have been set forth, the subtle features and advantages of the present invention can best be set forth and appreciated by explaining the position of the structure of device 10 on a knitting pattern while in use. A sample knitting pattern for this purpose is then set forth below:

SAMPLE KNITTING PATTERN

Color A: Spring Green
Color B: Green
Color C: Dark Green
Color D: Lime Green
Row 1: y0, k9, sl 1, k1, y0, p9
Row 2: y0, k9, sl 1, k6, y0, p9
Row 3: y0, k9, sl 3, k6, y0, p9
Row 4: y0, k6, sl 7, y0, p3
Row 5: Repeat Row 2

Row 6: y0, k12, y0, sl 2.

Repeat these 6 rows 4 times each for colors A, B, C, A, C, D.

It should then be noted that a pattern includes several rows indicated in the sample pattern as "Row 1", "Row 2", and so forth. Further, each row of the pattern includes a plurality of knitting stitches or in other words, instructions to perform various knitting stitches. Patterns further often include various other instructions relating to colors and repetition, as shown in the sample pattern.

In operation, member 34 is first positioned such that edge 46 of member 36 is located under row 1 of the pattern, indicator 70 or peg 92 is located to indicate pattern position 1 in guide 68, or in other words, by the numeral "1", and indicator 72 or peg 94 is also located to indicate pattern position 1 in guide 28. After row 1 of the pattern has been knitted, member 34 may be is positioned such that edge 46 of member 36 is located under row 2 of the pattern, and indicator 70 or peg 92 positioned to indicate pattern position 2 in guide member 68, or in other words by the numeral "2". Similarly, after row 2 of the pattern has been knitted, member 34 may be positioned such that edge 46 of member 36 is located under row 3 of the pattern, and indicator 70 or peg 92 positioned to indicate pattern position 3 in guide 68, or in other words, by the numeral "3".

Knitting stitches in the rows of the knitting pattern are often very similar as in rows 1-3 of the sample pattern. Many times, persons knitting would become confused while knitting and inadvertantly skip to a wrong row and follow the knitting stitches in this incorrect row. Such errors may not become noticeable until several rows of knitting had become completed. Thus, after the error was discovered, all the knitting performed in the rows past the error would have to be unraveiled which is not only very time consuming and anti-productive but also very disheartening to the knitter. The present invention solves this problem because member 34 visually highlights a single row in the pattern and therefore erroneously skipping to an incorrect row is prevented.

After row 3 of the pattern has been knitted, member 34 may be positioned such that edge 46 of member 36 is located under row 4 of the pattern, and indicator 70 or peg 92 positioned to indicate pattern position 4 in guide 68, or in other words, by the numeral "4".

Likewise, after row 4 of the pattern has been knitted, member 34 may be positioned such that edge 46 of member 36 is located under row 5 of the pattern, and indicator 70 or peg 92 positioned to indicate pattern position 5 in guide 68, or in other words, by the numeral "5". Row 5 of the knitting pattern refers the knitter back to row 2 of the pattern. Therefore, member 34 may be positioned such that edge 46 of member 36 is located under row 2 of the pattern again.

After row 2 of the pattern has been repeated, or in other words, row 5 has been knitted, member 34 may be positioned such that edge 46 of member 36 is located under row 6 of the pattern, and indicator 70 or peg 92 positioned to indicate pattern position 6 in guide 68, or in other words, by the numeral "6".

Knitting patterns also often include rows which simply state to repeat a previous row in the pattern, such as row 5 in the sample pattern which instructs the knittter to repeat row 2. Often, after repeating a row, knitters forget to go back to the correct pattern position but rather continue on to the next row after the repeated row. For example, after repeating row 2 in the prior art, the knitter could then simply continue the pattern to row 3 rather than go to row 6 which is the correct pattern position. Such errors can occur when the knitters, especially beginning knitters, have to concentrate on performing the kntting stitches or by lack of attention and are especially prone when the knitting is interrupted where the knitter may stop knitting for a period of time such as overnight. Errors occuring because of the knitter is not in the correct knitting position in the pattern may not become noticeable until several rows of knitting has been completed. Thus, after the error was discovered, all the knitting performed past the error would have to be unravelled, which is not only very time consuming and anti-productive but also very disheartening to the knitter. The present invention solves this problem also because indicator 70 or peg 92 indicates the correct pattern position and therefore the knitter immediately knows the correct row of the pattern to return to and thus does not go to a wrong pattern position as may occur without the present invention.

After row 6 of the pattern has been knitted, member 34 may be positioned such that edge 46 of member 36 is located under row 1 of the pattern, indicator 70 or peg 92 positioned to indicate pattern position 1 in guide 68, or in other words, by the numeral "1", and indicator 72 or peg 94 positioned to indicate pattern position 2 in guide 68, or in other words, by the numeral "2".

Likewise, after rows 1 through 6 have been repeated in a similar manner by moving member 34 and indicator 70 or peg 92, again member 34 may be is positioned such that edge 46 of member 36 is located under row 1 of the pattern, indicator 70 or peg 92 positioned to indicate pattern position 1 in guide 68, or in other words, by the numeral "1", and indicator 72 or peg 94 positioned to indicate pattern position 3 in guide 68, or in other words, by the numeral "3".

Similarly, the structure of device 10 is then positioned until the knitting has been completed according to the instructions of the pattern.

After the teachings of the present invention have become known, alternate uses of indicators 70 and 72 or pegs 92 and 94 would be obvious to persons skilled in the art. For example, indicator 72 or peg 94 could be utilized to indicate the color in the sample pattern rather than the number of repetitions of the six rows, such that when indicator 72 or 94 was located in pattern position 1, it would indicate the color A, in the pattern position 2, the color B, and similar approaches.

It can then be seen that pattern 12 is held in a flat or smooth position on face 24 of member 14 by clip 32 or 32' and member 36 and does not bend or flex as may occur if the pattern was not so supported. Thus device 10 presents pattern 12 in a more readable condition. Further, pattern 12 is also held in a visually better position by device 10 due to easel member 28 than if pattern 12 was laid on the floor or the lap of the knitter or if propped against another article. It should also be noted that since pattern 12 is located in device 10, it is also protected from external forces which could tear or otherwise damage pattern 12 if pattern 12 were not so protected.

Device 10 also allows for the visual summation of the pattern position because all the pattern positions are indicated by a single member, specifically notation member 34. Specifically, member 34 simultaneously and synergistically includes underscoring member 36 which visually highlights the row of the pattern 12 being knitted and member 38, shown in a first preferred form as including indicators 70 and 72 and shown in a second preferred form as including pegs 92 and 94, which indicate the pattern positions on guide 68 as set forth above.

Device 10 also allows for the recordation of the pattern position. Specifically, pattern 12 located in device 10 can be placed with the knitting supplies, with the notation number 34 located in the position indicating the last pattern position. When the knitter wishes to continue knitting, no matter what length of time has passed, he/she can immediately see the pattern position he/she is located on as indicated by notation member 34 and can simply continue therefrom.

Now that the basic teachings of the present invention have been explained, many extensions and variations will be obvious to one having ordinary skill in the art. For example, visually highlighting member 36 may include a device for magnifying the row of the pattern being knitted to further assist the knitter in reading the knitting instructions of the row.

Although device 10 has been explained in reference to a knitting pattern and is particularly adapted thereto, device 10 can similarly be utilized with other patterns including but not limited to crochet patterns.

Thus, since the invention disclosed herein may be embodied in other specific forms without departing from the spirit or the general characteristic thereof, some of which forms have been indicated, the embodiment described herein is to be considered in all respects illustrative and not restrictive. The scope of the invention is indicated by the appended claims, rather than by the foregoing description, and all changes which come within the meaning and range of equivalency of the claims are intended to be embraced therein.

What is claimed is:

1. A device for simultaneously holding a pattern to be followed and indicating pattern information, with the pattern to be followed including several rows, with each of the rows including a plurality of instructions for performing various stitches, comprising, in combination: a pattern support member including a top edge, a bottom edge, a first side edge, a second side edge, a pattern support face, and a back face, with the pattern support face allowing the support of the pattern to be followed thereon; means for holding the pattern to be followed on the pattern support face of the pattern support member; and notation means for simultaneously delineating and also for visually summarizing the pattern position in the pattern to be followed at a single visual location, with the notation means comprising, in combination: means for visually highlighting the row of the pattern to be followed and means located on the visually highlighting means for indicating the position of the pattern to be followed, with the visually highlighting means being movable upon the pattern support face of the pattern support member in a direction generally parallel to the side edges and between the top and bottom edges, wherein the visually highlighting means comprises an elongated bar member having a first end, a second end, a top edge, a bottom edge, a first face, and a second face, wherein first and second grooves are formed in the back face of the pattern support member adjacent and parallel to but spaced from the side edges of the pattern support member, and wherein the elongated bar member is movably mounted upon the pattern support face of the pattern support member by first and second L-shaped members attached to the first and second ends of the elongated bar member and by first and second springs attached to the first and second L-shaped members, with the L-shaped members including a first leg attached to the end of the bar member which extends adjacent and parallel to the side edge of the pattern support member and include a second leg attached to the first leg which extends adjacent and parallel to but spaced from the back face of the pattern support member; and with the spring being attached to the second leg of the L-shaped member for slidable movement within the groove on the back face of the pattern support member.

2. The device of claim 1 wherein the pattern position indicating means comprises, in combination: a series of pattern positions located on the first face of the elongated bar member; at least a first indicator slidably mounted on the elongated member for indicating the desired pattern position.

3. The device of claim 2, wherein the pattern position indicating means includes a second indicator slidably mounted on the elongated member for indicating the desired pattern position.

4. The device of claim 2 wherein the series of pattern positions comprises a series of numerals located on the first face of the elongated bar member.

* * * * *